United States Patent [19]
Insausti et al.

[11] Patent Number: 5,445,296
[45] Date of Patent: Aug. 29, 1995

[54] AUTOMATIC COLUMNS DISPENSING PRODUCTS

[75] Inventors: Jose L. P. Insausti; Jesus E. Ibarrola, both of Peralta, Spain

[73] Assignee: Azkoyen Industrial, S.A., Peralta, Spain

[21] Appl. No.: 168,241

[22] Filed: Dec. 17, 1993

[30] Foreign Application Priority Data

Dec. 29, 1992 [ES] Spain ................... 9202632

[51] Int. Cl.6 ............................. B65G 59/00
[52] U.S. Cl. ........................... 221/7; 221/298
[58] Field of Search ............ 221/7, 289, 298, 299, 221/300, 301, 266, 2

[56] References Cited

U.S. PATENT DOCUMENTS

| | | | |
|---|---|---|---|
| 3,702,665 | 11/1972 | Rainey | 221/301 |
| 4,574,980 | 3/1986 | Kurosawa et al. | 221/298 |
| 4,673,105 | 6/1987 | Kurosawa et al. | 221/298 |
| 5,067,634 | 11/1991 | Guindulain | 221/298 |

FOREIGN PATENT DOCUMENTS

| | | | |
|---|---|---|---|
| 0027495 | 2/1991 | Japan | 221/298 |
| 4-049489 | 2/1992 | Japan | 221/298 |
| 194295 | 4/1971 | Spain | . |
| 411713 | 2/1973 | Spain | . |
| 8703213 | 11/1987 | Spain | . |
| 8801706 | 5/1988 | Spain | . |
| 8900887 | 3/1989 | Spain | . |
| 9002052 | 7/1990 | Spain | . |
| 1768485 | 10/1992 | U.S.S.R. | 221/298 |
| 92/002907 | 2/1992 | WIPO | 221/298 |

Primary Examiner—H. Grant Skaggs
Attorney, Agent, or Firm—Keck, Mahin & Cate

[57] ABSTRACT

An automatic dispensing machine has a fixed column structure. Just above a gearmotor, a lever supports a rotating platform. The rotating platform, in turn, supports a pile of packets to be dispensed, so that when a cam is retracted, the lever swings down and allows the platform to freely rotate and, hence, unload the packet supported on the platform. The penultimate packet, and other packets in the pile, are held, during unloading, by a rotating grip that is projected towards the penultimate packet by a pair of springs. A cam is located at the top end of the camshaft and is rotated to release, in due course, the pile of packets and allow the same to move down to lie on the bottom platform.

4 Claims, 3 Drawing Sheets

AUTOMATIC COLUMNS DISPENSING PRODUCTS

OBJECT OF THE INVENTION

The present invention relates to a number of improvements to dispensing columns of the kind used in automatic machines, designed to supply different products in packet form such as, for instance, tobacco. Such machines are typically activated upon the insertion of a coin or a number of coins duly controlled by a selector. In particular, the improvements relate to the mechanism for expelling the packet at the bottom end position within the dispensing column.

BACKGROUND OF THE INVENTION

Spanish patent 411,713 and Spanish utility model Publication 194,295 related to improvements to packet expeller devices useful in automatic product vending-machines dispensing products located in columns formed inside the machine.

In both Spanish patent 411,713 and Spanish utility model Publication 194,295 the expeller device comprises a horizontal platform forming a base supporting the column of packets to be dispensed. This platform is mounted to rotate and is associated with mechanical elements so that rotation is able to take place and the bottom packet can to leave. The rest of the packets are held by an extension of the platform, working with similar mechanical elements linked to the whole system.

In these two documents, the mechanism is rather complex due to the number of parts needed for the operation altogether involving expelling the bottom packet, holding the rest, guiding and driving such packet towards the outlet and so forth to be carried out.

Spanish patent 8703213 affords provides a simpler solution, using a box to pile the packets. A rotating base is mounted upon a shaft to which an arm is respectively articulated to rotate with such base in such a way that when the latter swings down, it allows the bottom packet in the column to drop sliding. The arm rotates at the same time in order for its end to drive and press against a side of the penultimate packet, holding the entire column. The two elements (rotating base and arm) are returned to their original positions by respective springs, that must be suitably scaled in order to perform effectively. Furthermore, the springs, when used, undergo the usual deformation and stretching that leads to a faulty operation of the mechanism.

Spanish patent 8801706 provides a solution that is also simple, using a sort of grip that holds the penultimate packet in the column and hence logically the whole column. The bottom packet is expelled when the base supporting the entire column of packets rotates. The mechanism is hinged to the end of the shaft of an electric magnet. So that when the magnet coil is energised its respective core moves axially to either close the grip holding the entire column of packets from the next to last one, causing the supporting platform to swing at the same time to expel the bottom packet, or the base to swing in the opposite direction so that, when the bottom packet has been expelled, the remaining packets in the column shall rest upon the platform. In this operation, the grip is simultaneously opened in order for the column of packets to precisely move down and rest upon the bottom supporting base or platform.

Although this solution can be simple in its overall construction, it has a severe drawback in that its operation is dependent upon the operation of an electric magnet, which implies the need for a high circuit intensity and a violent activation. Moreover, high precision is required to assemble and link the parts, which without doubt renders the mechanism more expensive because the whole manufacturing and assembling process must be carried out with precision and within minimum tolerances for the system to work properly.

Another drawback in classic systems lies in that the system holding the column of packets gradually strains the product in proportion to the stroke of the holding mechanism.

Another solution is set out in Spanish patent 8900887 for a unit product extractor. The pile of packets in the extractor lies upon a rotating platform. The pile having a grip to fix or lock the second packet and all packets located above the same, at the stage of rotation of the bottom plate or platform. The mechanical solution adopted being in this case is the transmission of movement from a drive unit to a cogwheel, this cogwheel receiving a lever eccentrically that is in turn hinged to the base of the rotating platform. Consequently, depending upon the position of the lever, the platform holding the packets stays horizontal or swings down. The supporting platform itself drives, by means of an L-shaped extension at one of its ends, the grip holding the second packet, opening the same when the platform is horizontal to allow the pile to move down due to gravity.

This solution has a number of drawbacks that are essentially as follows:

There is a direct action between the mechanism holding the column or pile of packets and the mechanism extracting the same.

Locking and holding of the pile of packets subject to the rotation of the bottom platform takes place at the same time as rotation begins.

The last packet drops due to simple gravity, which, on the one hand, entails an absence of a swift step and, on the other, entails a risk that moisture or other problems may cause the packet to stick to the platform.

These drawbacks are fully solved by the mechanism forming the subject matter of Spanish patent 9002052 which is a substantial step forward in this field. The significant characteristics of this mechanism relate to the following aspects:

The mechanism holding the column of packets and the mechanism extracting the same are independent.

The column of packets is held with a constant force without the gradual activation mechanism being involved.

Thrusters are used to expedite extraction.

Front projections are included in the thrusting element developed upwards of the products dispensing column, designed to draw apart bottom packets in the column that may have become stuck.

More specifically, the mechanism of Spanish patent 9002052 provides the use of a micromotor having the appropriate gear, its shaft being fitted with a triple cam, such that while the top cam holds the column of packets, from the last but one, pressing against the same, the bottom cam is linked to a platform supporting the column, allowing the same to-swing as appropriate to allow the packet to be expelled, obviously immediately after the top cam acts to fix the remaining packets. In the meantime, the middle cam works precisely to expel by thrusting, upon turning, the said bottom packet in the column, the packet sliding on the sloped platform.

SUMMARY OF THE INVENTION

The improvements subject of the invention, relying essentially on the functional philosophy of Spanish patent 9002052 mentioned above and of which the very applicant is the owner, are designed to achieve a better degree of performance.

More specifically and in order to achieve the above, and in accordance with one of the characteristics of the invention, the top cam does not drive the penultimate packet directly, as before, but a grip, mounted to rotate about the fixed column structure and working with one or more springs, that tends to swing permanently against the said penultimate packet to lock the same, the top cam driving in this case this grip to release the same when the pile of packets must move down.

In accordance with another characteristic of the invention the bottom cam does not drive the rotating platform supporting the pile of packets directly but a lever under such platform, that is also hinged to the fixed column structure and represents a bottom mobile support for the said platform, allowing the same to have an optimal degree of rotation and affording a better distribution of the forces.

Finally, and as concerns the middle cam, the latter does not act upon the bottom packet as before, but upon the bottom lever forcing the same to be lowered when the platform must swing with the bottom packet, causing the said lever to drive the packet directly.

A micro-trembler feeler has also been provided to be located between the top rotating grip and the bottom rotating platform to count the packets dispensed by the column and the existence of such packets.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 1:
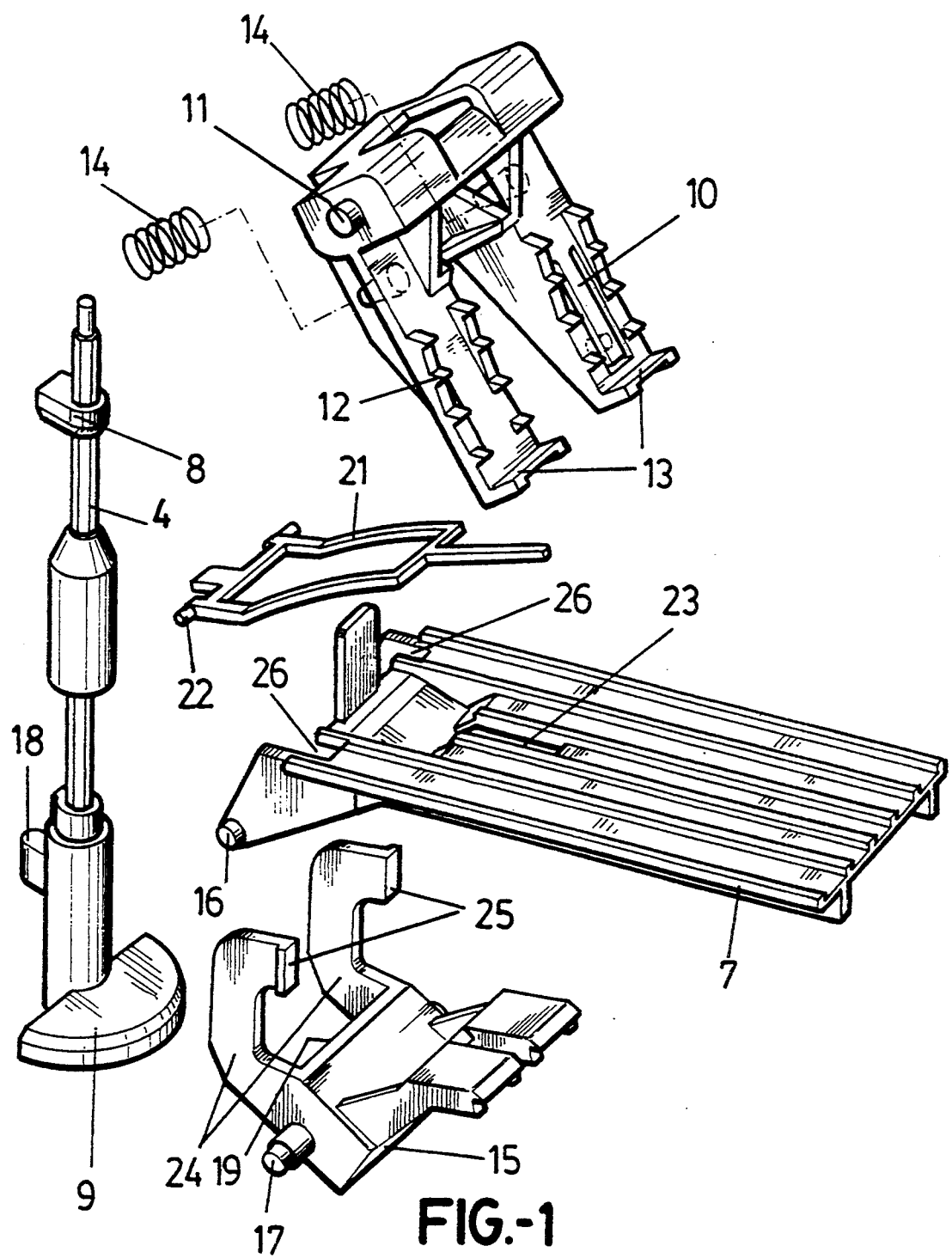
FIG. 1.—Is a perspective breakdown view of the various elements working in an automatic column dispensing products, subject of the improvements subject of the present invention.

In the light of these figures it is clear that the improvements subject of the invention are applicable to automatic machines (1) dispensing products conforming V-shaped rectangular packets that are duly piled within the column as such (2), the bottom end of which is provided with a fixed structure (3) upon which a turning shaft (4) is mounted, driven by an electric micromotor (5) through an appropriate gear (6), the said vertical shaft (4) having three cams to handle a bottom rotating platform (7) to hold the penultimate packet (1') and all those located above the same, while the bottom end packet (1) is being unloaded.

Now then, with this basic structure the improvements subject hereof lie in that the top cam (8) is arranged on the shaft (4) in a position contrary to the bottom cam (9) and therefore when the latter works on the rotating platform (7) the former does not do so on the bottom end packet (1), but being considerably upwardly displaced on the shaft (4), does so on a grip (10) that rotates about the fixed structure (3) through side pins (11) making up a hinge pin, the said grip (10) having a pair of side arms with cogs (12) on its front to enhance its bite on the penultimate packet (1') they face, and their bottom end having a bend (13) through which in addition to slightly thrusting the bottom end packet (1) they overlap the underside of the penultimate packet (1').

This grip (10) permanently tends to swing against the pile of packets (1) by action of a pair of robust springs (14), the top cam (8) being designed to override the effect of such springs, acting against the same and holding the grip at rest saving when the bottom platform (7) begins to swing by action of the likewise bottom cam (9).

Figure 2:
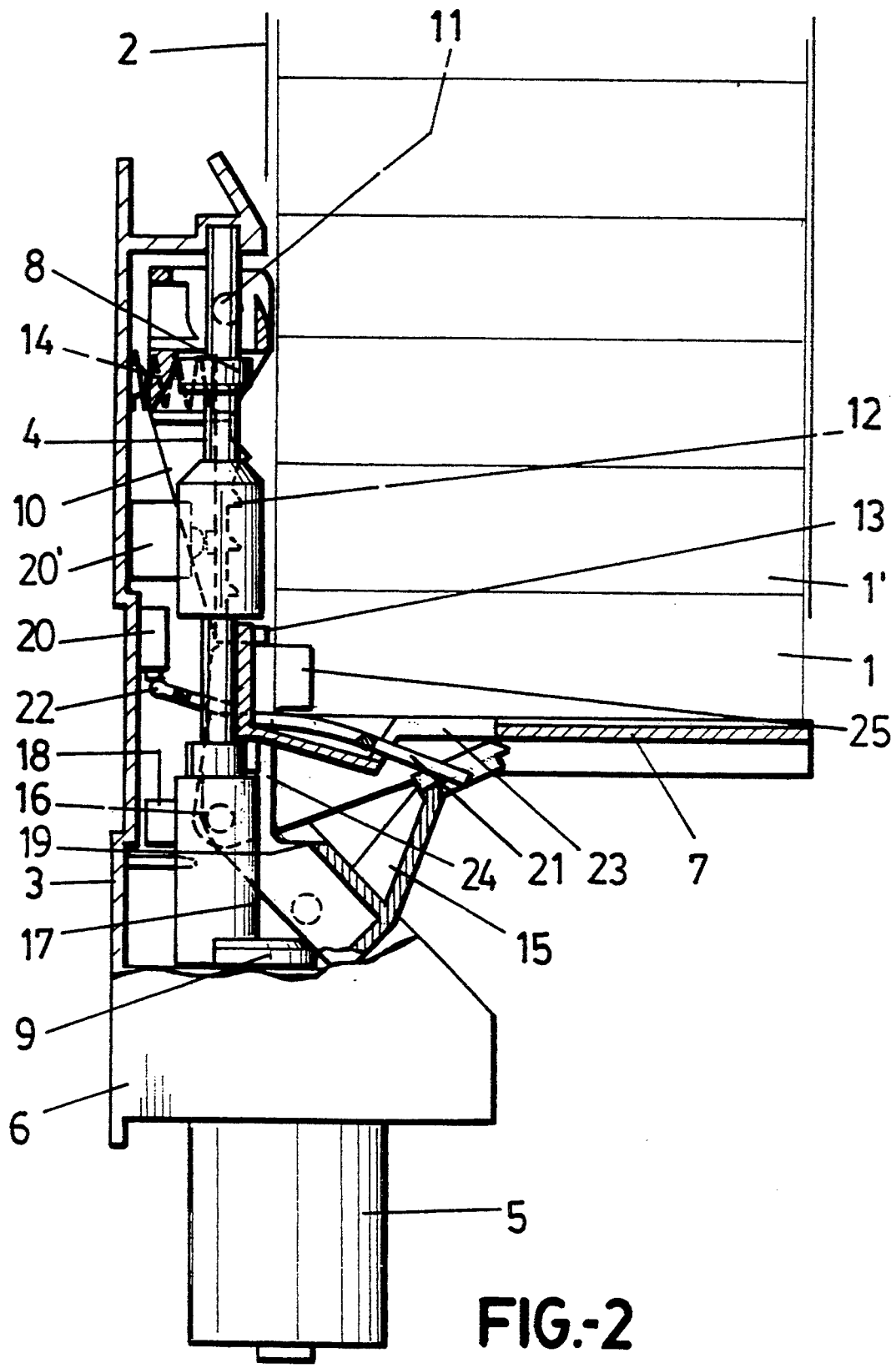
FIG. 2.—Is a side elevation view of the set of mechanisms of FIG. 1, duly mounted upon the fixed column structure.

In accordance with another characteristic of the invention and as aforesaid, the bottom cam (9) does not drive the rotating platform (7) directly but is substantially downwardly displaced in respect of the latter and drives a lever (15) that in turn drives the rotating platform (7) so that between the platform (7), lever (15) and fixed structure (3) a deformable triangle is established, specifically through the hinge pin (16) of the platform (7) and the hinge pin (17) of the lever (15), as can be perfectly seen in FIG. 2.

As to the middle cam (18) such is designed to drive the lever (15) helping the same and hence the platform (7) and the packet (1) to start rotating at the unloading stage, causing the packet (1) to slide on the platform (7), specifically driving the rear edge (19) of the said lever (15).

The column also has a micro-trembler (20) to detect packets in the column, comprising another end of stroke micro-trembler (20'), the micro-trembler (20) being fitted with a feeler (21) of considerable length, likewise hinged to the fixed structure (3) through a cross shaft (22) and the rotating platform (7) having a longitudinal middle window (23) in which the said feeler (21) is housed for the time being, preventing the latter from representing an obstacle to duly position the bottom end packet (1) on the said platform, and moving with the latter upon rotation until the said packet becomes detached therefrom, which is when the feeler (21) returns to the top limiting position to which it tends by action of the actual micro-trembler, before the penultimate packet (1') is released and performing the respective counting or energising of the said micro-trembler. The lever (15) has rear top arched arms (24) ending in two front expansions or abutments (25) through which the said lever drives the bottom packet (1) directly when pressed by the middle lever (18), upon the rear edge (19) lying between the said arms (24), the rotating platform (7) 10 further having notches (26) at its rear edge, operatively facing the arched arms (24) and designed for the latter to be fitted in part, to allow a greater degree of operation of the front abutments (25) on the packet (1).

Figures 3A, 3B:
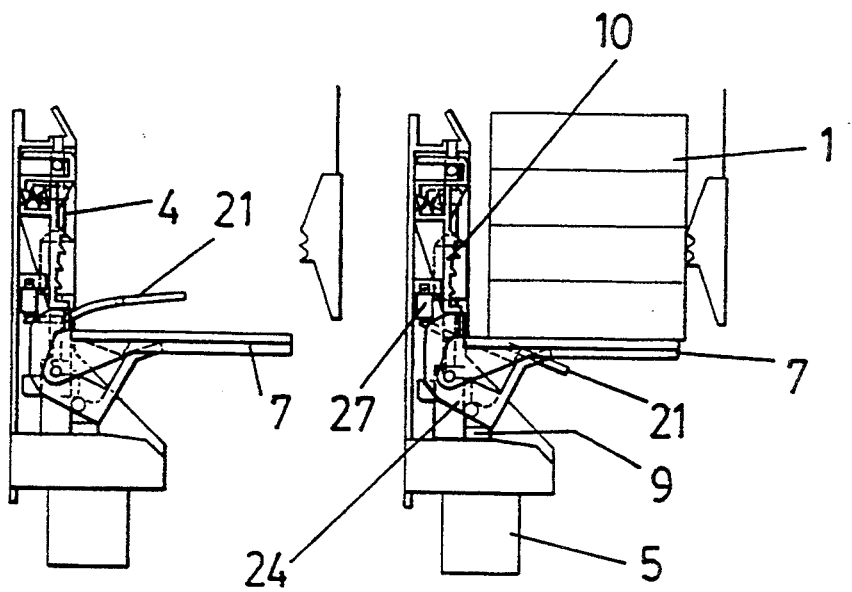
FIGS. 3A-3E.—Shows a number of sequences relating to an operative cycle of the dispensing column.

In accordance with this structure and as shown in FIG. 3, when the module is at rest, as in FIG. 3A, the bottom cam (9) holds the platform (7) horizontal through the lever (15), the top cam (8) holds the grip (10) at rest, and the feeler (21) switches on the micro-trembler (27) that will hence signal this position of absence of product. When a pile of packets (1) fills the dispensing column, as shown in FIG. 3B, the previous position is maintained, with the sole exception that the actual packets (1) drive the feeler (21) forcing the micro (27) to force the relevant signalling of load for the column.

Figures 3C, 3D, 3E:
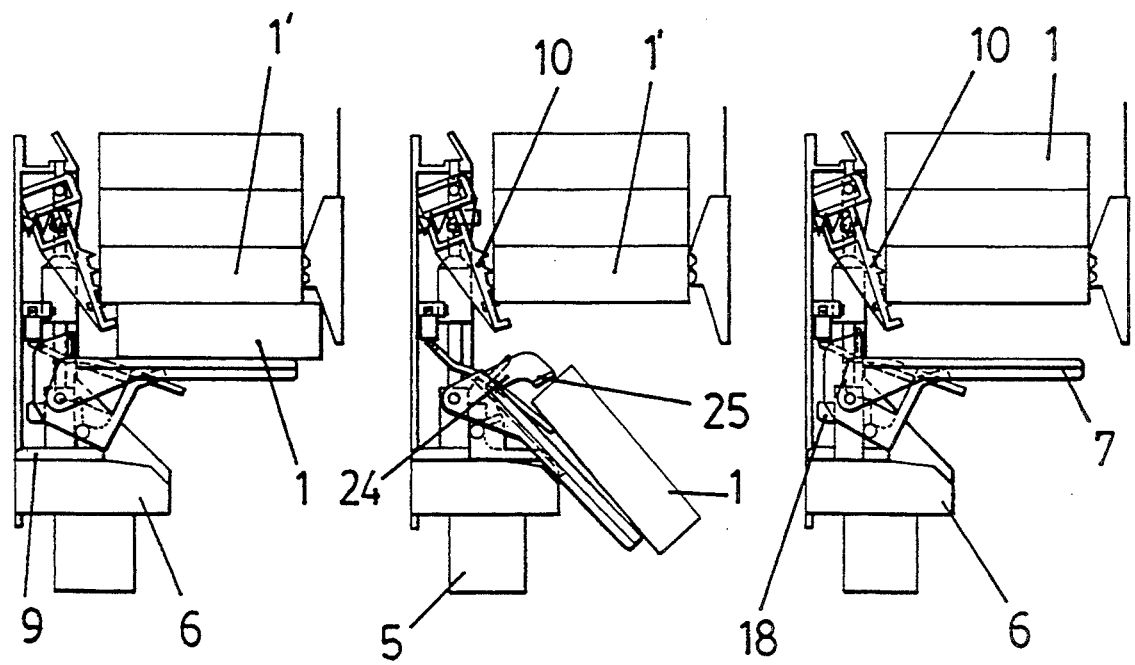

When upon insertion of the relevant coin or number of coins the motor (5) is energised the latter shall through the gear (6) supply a 360° rotatory movement to the shaft (4) and hence in the first place and in accordance with the drawing of FIG. 3C the top cam (8) ceases to drive the grip (10) whereas the cam (9) continues to be operative, because it is approximately semi-circular in shape, which means that the platform (7) remains horizontal while the grip (10) by action of the springs (14) locks the second packet (1') and subsequent packets, thrusting at the same time with the bent end (13) of one of its side branches against the bottom packet (1).

Just then and as shown in FIG. 3D the bottom cam (9) fully leaves the lever (15) that ceases to act as a support or dolly for the platform (7), which swings down both due to its own weight and the weight of the packet (1) located thereon, because the middle cam (18) drives the rear top edge (19) of the lever (15) causing the same to swing thus supported by the front abutments (25) of the very packet (1), moving the packet on the platform (7), ensuring that the same is expelled instantaneously.

Finally, and given the very shape and size of the bottom cam (9) the latter actually drives first of all and again on the lever (15) forcing the platform (7) to swing upwards, and it is only when the said platform (7) retrieves the horizontal position, as shown in FIG. 3E, that the top cam (8) drives the grip (10), causing the same to be unlocked for the pile of packets (1) to move down due to gravity and again recover the position of rest shown in FIG. 3B.

What is claimed is:

1. A mechanism for automatically dispensing products located in a pile forming a column comprising:
   a rotatable bottom platform supporting a pile of the products, rotation of the rotatable bottom platform allowing a bottom product to be expelled while others of said products are held until the rotatable bottom platform recovers its horizontal position and again supports the pile of the products after the bottom product has been expelled;
   an electric micromotor;
   an output shaft;
   a gear through which said electric micromotor drives said output shaft;
   cams provided on said output shaft for rotating the bottom platform and checking the products, excepting the bottom product;
   said output shaft extending substantially both downwards and upwards of the bottom product in the column, a top end area of said output shaft having one of the cams, said one of the cams and being located substantially above penultimate product;
   a fixed column structure forming a support;
   a grip, mounted for rotation upon the fixed column structure;
   a cross shaft through which the grip is rotatably mounted upon the fixed column structure;
   resilient means, formed by a pair of springs, for permanently biasing the grip for rotation against the penultimate product;
   said grip including small cogs that enhance its bite;
   the grip having arms, each of the arms of the grip having a right-angled bend acting as a thruster on the bottom product and to hold the penultimate product when the grip is released by the one of the cams and driven towards the pile of the products by the springs.

2. A mechanism for automatically dispensing products as defined by claim 1, and further comprising a middle lever and a shaft through which the middle lever is hinged to the fixed column structure, wherein a second one of the cams is a bottom cam driving the rotatable bottom platform and is substantially displaced downwards of an operative plane of said rotatable bottom platform and drives the middle lever hinged to the fixed structure through the shaft, the middle lever having a free end which drives an underside of the rotatable bottom platform.

3. A mechanism for automatically dispensing products as defined by claim 2, wherein a third one of the cams is level with the rotatable bottom platform, said third cam driving an inner edge of the middle lever right above the shaft through which the middle lever is hinged to the fixed column structure and forcing the same to be lowered when the bottom product slides on the rotatable bottom platform.

4. A mechanism for automatically dispensing products as defined by claim 1, and further comprising a feeler of an electric micro-trembler disposed between the grip and the rotatable bottom platform, said electric micro-trembler forming at least part of a counter circuit, the rotative bottom platform having a longitudinal middle slot housing the feeler while the bottom product lies upon the rotatable bottom platform.

* * * * *